United States Patent [19]

Whited

[11] 3,979,022

[45] Sept. 7, 1976

[54] MONITORING DEVICE
[75] Inventor: Charles A. Whited, Rochester, N.Y.
[73] Assignee: Xerox Corporation, Stamford, Conn.
[22] Filed: June 28, 1972
[21] Appl. No.: 266,936

[52] U.S. Cl. .............................. 222/23; 200/61.21; 335/274
[51] Int. Cl.² .......................................... B67D 1/08
[58] Field of Search ............... 340/246; 116/114 B; 222/51, 23; 335/274; 200/61.21

[56]         References Cited
         UNITED STATES PATENTS
2,116,075   5/1938   Lenhart ..................... 340/246 X
2,863,103   12/1958  Tancred ..................... 335/274 X
3,575,130   4/1971   Altmann ..................... 340/246 X
    FOREIGN PATENTS OR APPLICATIONS
876,167     1/1953   Germany ........................ 340/246

Primary Examiner—Allen N. Knowles
Assistant Examiner—Hadd Lane
Attorney, Agent, or Firm—H. Fleischer; J. J. Ralabate; C. A. Green

[57]           ABSTRACT

A device in which the quantity of particles stored in a container is monitored. The device is arranged to indicate when the supply of particles is beneath a predetermined level. A shaft member positioned in the particle storage container is rotated from a first position to a second position. When the level of particles therein is beneath the predetermined level, a magnetic torque overcomes the resistance offered by the particles to rotate the shaft from the first position to the second position indicating that additional particles should be added to the storage container.

2 Claims, 4 Drawing Figures 3,979,022

MONITORING DEVICE

BACKGROUND OF THE INVENTION

This invention relates generally to an apparatus for dispensing particles of granulated material, and more particularly concerns a device for monitoring the quantity of particles stored in the dispensing apparatus.

In the process of electrostatographic printing, an electrostatic charge pattern or latent image corresponding to an original document to be reproduced is recorded on an insulating medium. A viewable record is produced by developing the latent image with particles of granulated material to form a powder image thereof. Thereafter, the visible powder image is fused to the insulating medium, or transferred to a suitable support material and fused thereto. This type of process was originally disclosed in U.S. Pat. No. 2,297,691 issued to Carlson in 1942.

Development of the latent image is achieved by bringing a developer mix into contact therewith. Typical developer mixes generally comprise dyed or colored thermoplastic particles of granulated material, known in the art as toner particles, which are mixed with carrier granules, such as ferromagnetic granules. When appropriate, toner particles are mixed with carrier granules, the toner particles are charged triboelectrically to the correct polarity. As the developer mix is brought into contact with the electrostatic latent image, the electrical field produced by the latent image causes the toner particles to transfer from the carrier granules and adhere thereto. However, as toner particles are depleted from the developer mix, additional toner particles must be supplied thereto. In this way, the concentration of toner particles in the developer mix is maintained substantially constant.

In the operation of an electrostatographic printing machine, it is highly desirable to have means for indicating when the supply of toner particles in the dispensing apparatus has become exhausted. This enables the operator to add additional toner particles thereto to maintain optimum machine reproduction characteristics. Heretofore, the level of toner particles in the dispensing apparatus was determined by the machine operator lowering a graduated rod into the toner particles which indicated the quantity remaining therein by the operator visually noting the level of toner particles remaining on the rod. However, due to their extremely small size, the toner particles tend to become air borne when the dispenser is opened. The air borne toner particles contaminate the surrounding area, blacken the operator's hands and clothing, and create, in general, undesirable working conditions. In addition, toner particles handled in this manner have a tendency to become electrostatically attracted to any machine components having a charge of opposite polarity thereto. An improvement over the aforementioned manual method of determining the quantity of toner particles remaining in the dispenser is by a suitable electrical switching arrangement. This approach has a disadvantage in that the toner particles, due to their small size, may contaminate the switch resulting in erroneous signals being generated thereby.

Accordingly, it is a primary object of the present invention to improve the toner dispensing apparatus of an electrostatographic printing machine by monitoring the quantity of toner particles stored therein.

SUMMARY OF THE INVENTION

Briefly stated, and in accordance with the present invention, there is provided a device for monitoring the quantity of particles stored in a container.

This is accomplished in the present instance by sensing means moving from a first position to a second position. The sensing means is mounted for movement within the container contacting the particles stored therein. Means are provided for moving the sensing means from the first position to the second position when the particles are substantially spaced therefrom. In this way, the sensing means indicates that the quantity of particles stored in the container is beneath a predetermined level.

In accordance with a further aspect of the present invention, circuit means generate an electrical signal in response to the sensing means moving from the first position to the second position. This electrical signal actuates display means indicating that the quantity of particles stored in the container is beneath the predetermined level.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
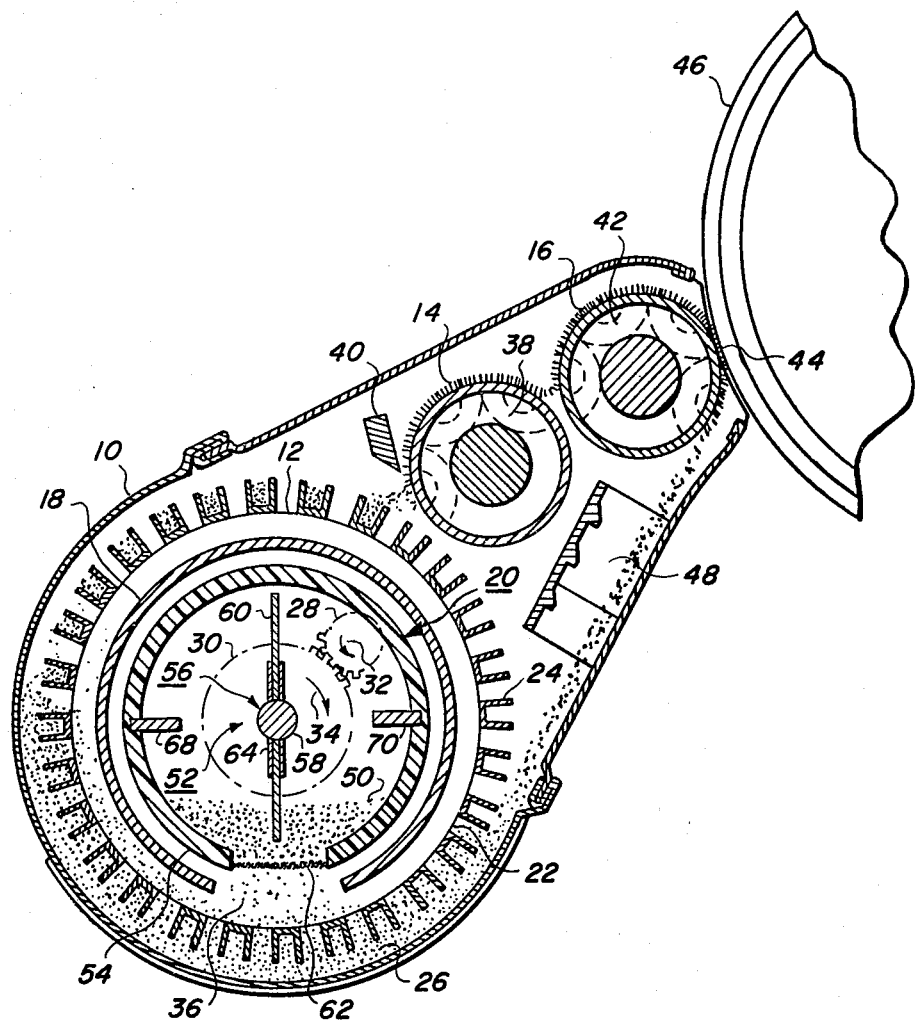
FIG. 1 is a sectional elevational view of a development apparatus for use in an electrostatographic printing machine.

Referring now to FIG. 1, there is shown an embodiment of the present invention, in a suitable environment such as a development unit of an electrostatographic printing machine, although it should be noted that the present invention is not intended to be limited thereto. The principle components of the development apparatus are developer housing 10, paddle wheel 12, transport roll 14, development roll 16, shroud 18, and a toner dispensing apparatus, indicated generally at 20. Paddle wheel 12 includes a rotary driven hub member 22 with buckets 24 spaced substantially equally around the outer circumferential surface thereof. As paddle wheel 12 rotates, developer mix 26 is elevated from the lower region of housing 10 to the upper region thereof.

In operation, clutch gear 28 meshes with gear 30 secured to paddle wheel 12. As gear 28 rotates in the direction of arrow 32, gear 30 is rotated in the direction of arrow 34, thereby rotating paddle wheel 12 in the direction of arrow 34. When developer mix 26 reaches the upper region of housing 10, it is lifted from buckets 24 to transport roll 14. Preferably, alternate buckets of paddle wheel 12 have apertures therein so that developer mix 26 carried therein falls back to the lower region of developer housing 10. As developer mix 26 falls to the lower region of developer housing 10, it cascades over shroud 18, which is preferably of a tubular configuration with an aperture or generally longitudinally extending slot 36 in the lower region thereof. Developer mix 26 is recirculated in this manner so that carrier granules are continually agitated to mix with fresh toner particles. This agitation generates a strong triboelectric charge between the carrier granules and toner particles. As developer mix 26 approaches transport roll 14, the magnetic flux field produced by magnets 38 mounted fixedly therein attract developer mix 26 thereto. Transport roll 14 moves developer mix 26 in an upwardly direction by the frictional force exerted between the roll surface and developer mix 26. Metering blade 40 is provided to control the amount of developer mix 26 carried over the top of transport roll 14. Surplus developer mix 26 is sheared from transport roll 14 and falls in a downwardly direction through the apertures of paddle wheel 12 into the lower region of developer housing 10.

Developer mix 26 which passes metering blade 40 is carried over transport roll 14 and is, subsequently, attracted to developer roll 16 by the magnetic flux field produced by magnets 42 mounted fixedly therein. Developer roll 16 moves developer mix 26 into development zone 44 located adjacent insulating medium 46 having an electrostatic latent image recorded thereon. The latent image is developed by contact with the moving developer mix 26, i.e. the latent image electrostatically attracts toner particles from the carrier granules of developer mix 26 thereto.

At the exit of development zone 44, the magnetic field in a direction generally tangential to developer roll 16 continues to secured thereto unused developer mix and denuded carrier granules, i.e. carrier granules which have had toner particles removed therefrom during the development process. Upon passing from development zone 44, the unused developer mix and denuded carrier granules enter a region relatively free from magnetic forces and fall from developer roll 16 in a downwardly direction into the lower region of developer housing 10. As the unused developer mix and denuded carrier granules descend, they pass through mixing baffle 48 which directs the flow from the end towards the center of developer housing 10 to provide mixing in this direction. Shroud 18 serves to control the fall of the unused developer mix and denuded carrier granules such that they mix with the toner particles rather than simply falling into the lower region of developer housing 10. Furthermore, shroud 18 isolates from developer mix 26, an interior cylindrical enclosure which is used to house toner dispensing apparatus 20 containing a fresh supply of toner particles 50.

Toner dispensing apparatus 20 is mounted substantially fixedly in developer housing 10. Toner particles 50 are discharged therefrom when grid or aperture 62 moves back and forth across the bottom of dispenser 20. Toner particles 50 pass from dispensing apparatus 20 through slot 36 in shroud 18 into the stream of developer mix 26. Adding toner particles 50 at this location insures that it cannot be carried into development zone 44 without some degree of mixing with the denuded carrier granules. Additional toner particles 50 are added to developer mix 26 in order to replace those used in the formation of powder images. This maintains the toner particle concentration substantially constant providing substantially uniform image developability. A monitoring device, shown generally at 52, indicates the level of toner particles remaining in the toner dispensing apparatus 20. When the quantity of toner particles remaining in the chamber of storing means or container 54 is depleted beneath a predetermined level for optimum machine performance, the monitoring device closes a switch in a suitable circuit arrangement. The circuit includes a voltage source arranged to generate an electrical signal actuating a display means such as a panel light or buzzer indicating that the toner particle level is low. Thereupon, the operator may shut down the electrostatographic printing machine and add additional toner particles thereto.

Figure 2:
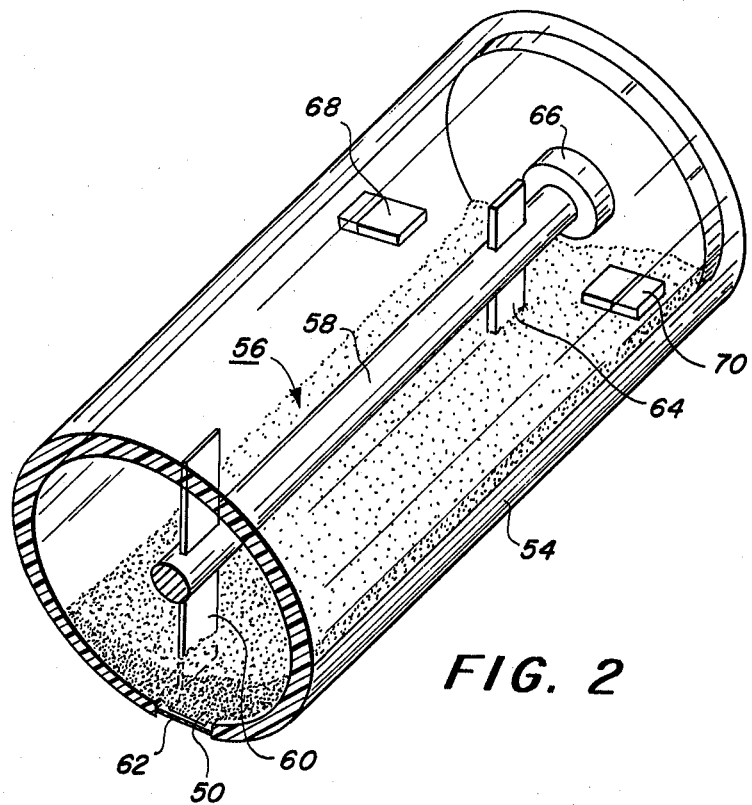
FIG. 2 is a schematic perspective view of a toner dispenser having the present invention therein and adapted for usage in the development depicted in FIG. 1.

Turning now to FIG. 2, the detailed structural configuration of monitoring device 52 is shown therein. Monitoring device 52, preferably, includes sensing means or a shaft member, shown generally at reference numeral 56, rotatably mounted in container 54. Shaft member 56 includes a rod 58 having a generally planar surface 60 in the region of the lower end portion thereof which is adated to be in contact with toner particles 50 remaining in container 54. Container 54 includes discharging means or a perforated region 62 therein for dispensing toner particles from the chamber within container 54. As toner particles 50 descend therefrom the quantity of particles within container 54 is depleted. When surface 60 is no longer in contact with toner particles 50, shaft member 56 rotates from a first position to a second position closing the switch in the electrical circuit and energizing the panel light or buzzer indicating that the level of toner particles 50 in container 54 is beneath that required for optimum machine operation.

Means are provided for moving the sensing means, i.e. to rotate shaft member 56, from the first position (shown in FIG. 2), indicating a sufficient supply of toner particles within container 54, to the second position, indicating a low level condition. Preferably, the moving means includes first magnetic means mounted fixedly on shaft member 56 and second magnetic means mounted fixedly on container 54. Both of the magnetic means are arranged to cooperate with one another to produce a magnetic flux field which exerts a torque on shaft member 56. The magnetic torque rotates shaft member 56 from the first position to the second position when the quantity of particles in container 54 is beneath a predetermined level i.e. beneath planar surface 60 of shaft member 56. Preferably, the first magnetic means is a bar magnet 64 mounted in the region of the upper end portion of shaft member 56 opposed from planar surface 60.

Figure 3:
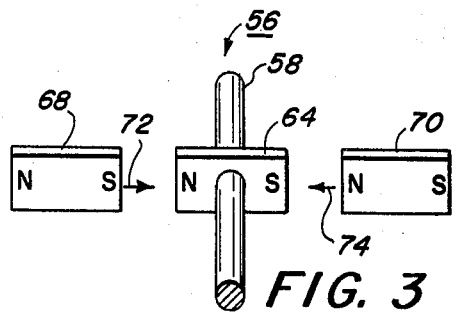
FIG. 3 is an enlarged, fragmentary perspective view of the means provided for moving the sensing means of the FIG. 2 toner dispenser when the quantity of toner particles is beneath the predetermined level.

As shown in FIG. 2, bar magnet 64 is mounted fixedly on rod 58 in the region of the upper end portion thereof opposed from planar surface 60. Rod 58 is mounted rotatably within container 54 is retaining ring 66. The second magnetic means, preferably, includes a pair of bar magnets 68 and 70 mounted fixedly on container 54. Bar magnet 64 is interposed between and spaced from the end portions of bar magnets 68 and 70, respectively. FIG. 3 indicates the orientation of bar magnet 64 with respect to bar magnets 68 and 70, when toner particles 50 have been discharged from container 54 to a level such that planar surface 60 of shaft member 56 is no longer in contact therewith. Thus, in the second position, bar magnet 64 is aligned with bar magnets 68 and 70. In this position, the north pole of bar magnet 64 is opposed from the south pole of bar magnet 68 producing a magnetic force in the direction of arrow 72. Similarly, the south pole of bar magnet 64 is aligned with the north pole of bar magnet 70 producing a magnetic force in the direction of arrow 74.

Figure 4:
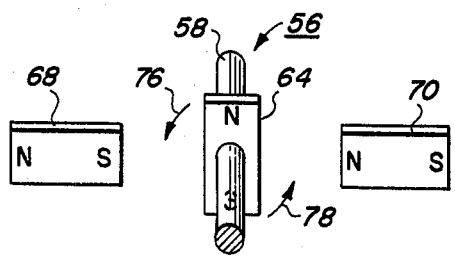
FIG. 4 is an enlarged fragmentary perspective view of the moving means shown in FIG. 3 when the quantity of toner particles is above the predetermined level.

Referring now to FIG. 4, there is shown shaft member 56 in the first position when toner particles 50 are in contact with planar surface 60. As indicated therein, bar magnet 64 is rotated so that its longitudinal axis is misaligned from the longitudinal axes of bar magnets 68 and 70, maximum magnetic torque being exerted thereon when bar magnet 64 approximately normal to the longitudinal axes of bar magnets 68 and 70. In this orientation, the magnetic flux field produced by the bar magnets in cooperation with one another exerts a torque on shaft member 56 in the direction of arrows 76 and 78. The torque exerted thereon is tending to align the north pole of bar magnet 64 with the south pole of bar magnet 68 and the south pole of bar magnet 64 with the north pole of bar magnet 70. However, toner particles 50, when in contact with surface 67, prevent shaft member 56 from rotating. Hence, it is seen that shaft member 56 is maintained in the first position, i.e. the magnetic torque exerted thereon is balanced by the torque exerted on planar surface 60 by toner particles 50.

In the first position, shaft member 56 indicates that a sufficient quantity of toner particles are present within container 54 to enable the electrostatographic printing machine to operate substantially at an optimum level. As toner particles 50 are dispensed from container 54 via perforated region 62 therein, the level thereof eventually is such that the particles are no longer in contact with surface 60 of shaft member 56. When this condition occurs, toner particles 50 no longer exert a restraining torque on shaft member 56. At this time, shaft member 56 rotates from the first position illustrated in FIG. 4 to the second position shown in FIG. 3. When shaft member 56 rotates from the first position to the second position, it may close a switch in the electrical circuit which generates an electrical signal energizing a panel light or buzzer indicating that the toner particles contained within container 54 are beneath a level predetermined for optimum machine performance.

While the invention has been described in connection with a magnetic apparatus for exerting a torque on shaft member 56, one skilled in the art will appreciate that the invention is not necessarily so limited and that any suitable biasing means may be utilized to exert the aforementioned torque thereon. For example, a suitable coil spring may be mounted on shaft member 56 in lieu of the magnetic arrangement presently proposed. The spring may be arranged to be in its non-extended position exerting substantially no torque on shaft member 56 when in the second position and, in its extended position exerting torque on shaft member 56 when in the first position. Thus, the spring rather than the magnetic arrangement functions as the biasing means for moving the sensing means, i.e. shaft member, from the first position to the second position.

In recapitulation, it is apparent that the present invention improves the toner dispensing apparatus of an electrostatographic printing machine by monitoring the quantity of toner particles stored therein. The aforementioned is achieved by sensing means arranged to move from a first position to a second position indicating that the quantity of toner particles remaining in the chamber of the storing means is beneath a level predetermined for optimum machine performance.

It is, therefore, evident that there has been provided in accordance with the present invention, an apparatus for monitoring the quantity of toner particles stored in a toner dispensing apparatus that fully satisfies the objects, aims and advantages set forth above. While this invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A device for monitoring the quantity of particles stored in a container, including;
    sensing means mounted for movement within the container and being in contact with the particles stored therein, said sensing means comprising a shaft member mounted rotatably within the container and having a generally planar surface with a portion thereof adapted to contact the particles stored in the container;
    first magnetic means mounted on said shaft member in the region of the end portion thereof opposed from the planar surface in a spaced relationship with the particles stored in the container; and
    second magnetic means mounted on said container substantially aligned with said first magnetic means and radially spaced therefrom, said second magnetic means cooperating with said first magnetic means to exert a torque on said shaft member for rotating said shaft member from the first position to the second position when the quantity of particles stored in the container is beneath the predetermined level.

2. An electrostatographic printing machine of the type having a development apparatus utilizing carrier granules and toner particles therein, including:
    means defining a chamber for storing a supply of toner particles therein;
    means for discharging toner particles from said storing means;
    sensing means mounted for movement within the chamber of said storing means and being in contact with the toner particles remaining therein, said sensing means comprising a shaft member mounted rotatably within the chamber of said storing means and having a generally planar surface with a portion thereof contacting the toner particles remaining therein;
    first magnetic means mounted on said shaft member in the region of the end portion thereof opposed from the planar surface in a spaced relationship with the toner particles stored in the chamber of said storing means; and
    second magnetic means mounted on said storing means substantially aligned with said first magnetic means and radially spaced therefrom, said second magnetic means cooperating with said first magnetic means to exert a torque on said shaft member for rotating said shaft member from the first position to the second position when the quantity of toner particles remaining in the chamber of said storing means is beneath the predetermined level.

* * * * *